United States Patent [19]
Karpinski, Jr. et al.

[11] Patent Number: 5,801,377
[45] Date of Patent: Sep. 1, 1998

[54] REDUCING DITHER INDUCED ERRORS FROM PATH LENGTH CONTROL RESETS IN A RING LASER GYRO

[75] Inventors: Andrew J. Karpinski, Jr., Clearwater, Fla.; Steven C. Albers, Coon Rapids; Timothy J. Callaghan, Roseville, both of Minn.

[73] Assignee: Honeywell Inc.

[21] Appl. No.: 801,387

[22] Filed: Feb. 20, 1997

[51] Int. Cl.[6] .................................................. G01C 19/66
[52] U.S. Cl. ................................... 250/231.12; 356/350
[58] Field of Search ........................ 250/231.12, 214 R; 356/350, 349; 372/94

[56] References Cited

U.S. PATENT DOCUMENTS 5,335,063  8/1994  Karpinski, Jr. ............... 356/350
5,357,338  10/1994  Hutchings ..................... 356/350

Primary Examiner—Edward P. Westin
Assistant Examiner—Kevin Pyo
Attorney, Agent, or Firm—Robert E. Greenstien

[57] ABSTRACT

An integrator in a ring laser gyro that produces an output for changing the path length is reset synchronously with a gyro dither signal to reduce gyro errors from the dithering operation during the reset.

4 Claims, 2 Drawing Sheets

5,801,377

REDUCING DITHER INDUCED ERRORS FROM PATH LENGTH CONTROL RESETS IN A RING LASER GYRO

The invention was made with Government support under Contract F04701-98-C-0049, awarded by the Department of the Air Force. The Government has certain rights in the invention.

TECHNICAL FIELD OF THE INVENTION

This invention relates ring laser gyros, in particular techniques for reducing dither induced errors resulting from path length control resets in a ring laser gyro (RLG).

BACKGROUND OF THE INVENTION

Resetting or adjusting the laser path length in an ring laser gyro is done to optimize its accuracy and sensitivity and gyro performance can be temporarily degraded due to transient effects during the reset. But, by interpolating the gyro output during the reset interval, the degradation can be mitigated.

A ring laser gyro can be "dithered", a mechanical process that involves rotating it back and forth to force a phase difference between the two laser beams as a way to prevent the beams from locking on to each other. The gyro's output can be filtered to discard the effects from the dither frequency. However, dithering a ring laser gyro complicates the gyro path length reset process if, as often happens, the phase of the dither signal with respect to the complete dither cycle is not identical at the beginning and end of the reset signal because the difference produces a transient in the gyro output that passes through the filter.

DISCLOSURE OF THE INVENTION

An object of the present invention is reducing dither induced errors resulting from path length control resets in a ring laser gyro.

According to the invention, path length reset is synchronized with gyro dithering so that at the beginning and end of the reset signal the phase relative to the dither cycle of the dithering signals are identical.

According to the invention, in a ring laser gyro comprising path length reset means for resetting the gyro path length and dithering means for dithering the gyro in response to a dithering signal, the reset means comprises means that is responsive to a reset signal for integrating a DC signal manifesting the path length and varying the path length in response to the DC signal, and the synchronizing means sets the DC signal at a specific level only if the reset signal is present and the dithering signal is at a pre-selected phase relative to the complete dither cycle.

According to the invention, the reset signal is clocked to an integrator by the dithering signal.

Other objects, benefits and features of the invention will be apparent from the following discussion of one or more embodiments.

BEST MODE FOR CARRYING OUT THE INVENTION

Figure 1:
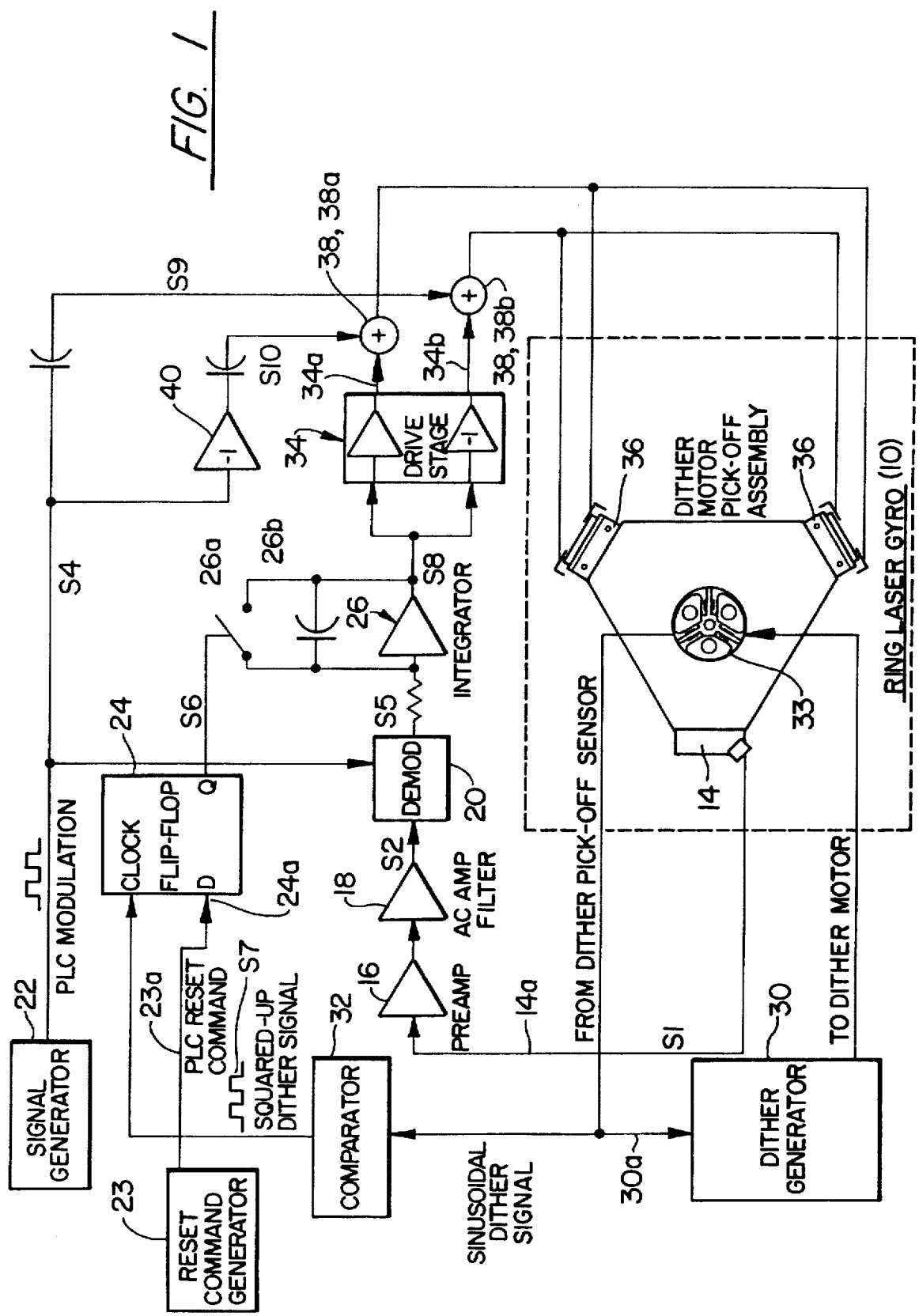
FIG. 1 is a functional block diagram of ring laser gyro embodying the present invention.
Figure 2:
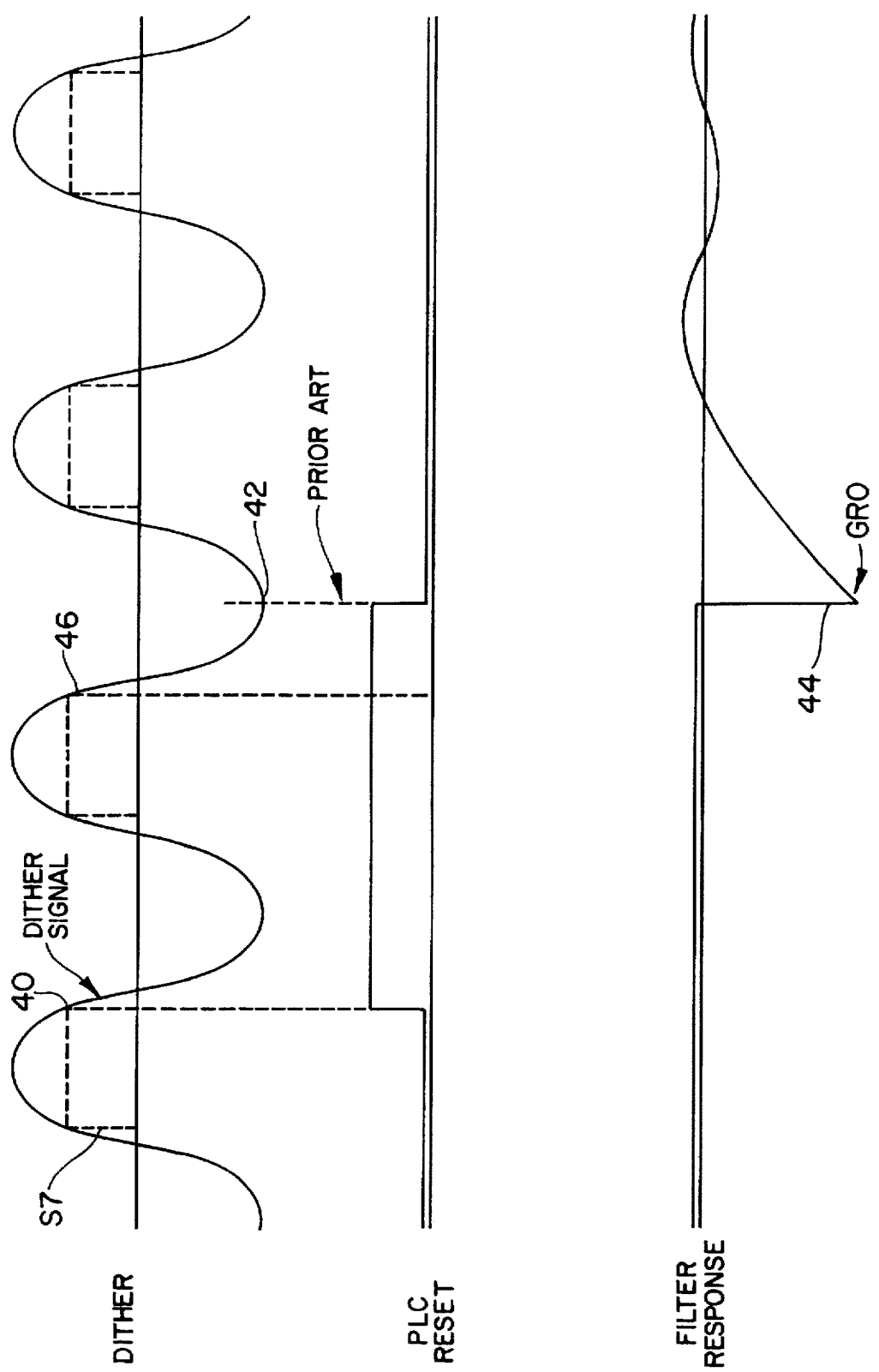
FIG. 2 shows on a common time base a dither signal, reset signal and filtered gyro rate output signal in a ring laser gyro.

FIG. 1 shows a typical ring laser gyro 10 that includes a laser power detector 14 that receives laser energy (light) within the ring laser gyro, producing a signal S1 on the output line 14a. The signal S1 is processed by preamp 16 and AC amp and filter 18 to apply a signal S2, manifesting the power of the light, to a demodulator 20. A signal generator 22 produces a square wave PLC modulation signal S4 that is applied to the demodulator 20. A reset command generator 23 produces a PLC reset command signal (PLC reset) on the line 23a, which is applied to the data input 24a of an edge-sensitive flip-flop 24. The output from the demodulator 20 is a signal S5 with a magnitude that represents the deviation from maximum laser power in the gyro 10. The signal S5 is applied to an integrator 26 that is reset by an output S6 from the flip-flop 24. When the PLC reset is clocked through the flip-flop by the clock pulses S7, which are the output from a comparator 32, the output signal S6 changes state, activating a switch 26a to discharge a feedback capacitor 26b. This resets the integrator 26, placing the signal S8 at a selected level, e.g., zero. Dither generator 30 produces a dither signal that is supplied on output 30a to the comparator 32, which produces the clock signal S7 synchronously with the dither signal S7, shown in FIG. 2 as a sine wave. The dither signal is applied to a dither motor 33 which is mechanically connected to the gyro to dither the gyro at the frequency of the dither signal.

The integrator 26 integrates the signal S5 and the output S8 is applied to the differential driver 34 having inverted (180 degrees out of phase) outputs 34a, 34b and these are summed with signals S9, S10 at summers 38. The outputs from the summers 38 drive transducers 36, which are mechanically coupled to the gyro 10, to change its length so as to optimize the laser power in the cavity. The modulation signal S4 is applied to the transducers and enhances the transducer displacement. In particular, the modulation signal S4 is applied to an inverter 40 with an output that is AC coupled to one summer 38a and the inverter 40 produces the signal S10. The modulation S4 is AC coupled but non-inverted to the other summer 38b.

When the signal S6 is produced, resetting the integrator, and when it is terminated, the phase of the dither signal is the same. This eliminates a problem illustrated in FIG. 2, where the dither signal and the square wave derivative, signal S7, are shown. In prior ring laser gyros with dither and reset functions, the PLC reset signal can, relative to the dither signal, begin at one point 40 on the dither signal and end at another point 42 with a different phase, which produces a dither induced transient 44 in the gyro rate output GRO. The equal-phase points 40 and 46 on the dither signal, on the other hand, define the reset interval with the invention shown in FIG. 1, which minimizes the production of the transient 44.

With the benefit of the previous discussion of the invention, one of ordinary skill in the may be able to modify the invention, and the functions and functional elements described above, in whole or in part without departing from the true scope and spirit of the invention.

We claim:

1. A ring laser gyro comprising path length reset means for resetting a gyro path length control and dithering means for dithering the gyro in response to a dithering signal, characterized by:

the reset means comprising means for integrating a DC signal which represents the path length to produce an integrated DC signal and varying the path length in response to the integrated DC signal; and synchronizing means responsive to a reset signal for setting the DC signal at a specific level if the reset signal is present and the dithering signal is at a preselected state.

2. The ring laser gyro described in claim 1, wherein the means for integrating comprises:

an integrator comprising a capacitor; and a switch activated by the reset signal to discharge the capacitor.

3. The ring laser gyro described in claim 2, wherein the synchronizing means comprises:

a flip-flop for producing the reset signal as an output with the dither signal as a clock signal and a path length reset signal as the data input to the flip-flop.

4. The ring laser gyro described in claim 1, wherein the means for integrating comprises:

means for generating a clock timing signal from the dither signal; and means for clocking a path length reset signal with the clock timing signal to set the integrated DC signal at the specific level.

* * * * *